(12) United States Patent
Choi

(10) Patent No.: US 10,115,239 B2
(45) Date of Patent: Oct. 30, 2018

(54) PORTABLE MR DEVICE

(71) Applicant: Hae-Yong Choi, Seoul (KR)

(72) Inventor: Hae-Yong Choi, Seoul (KR)

( * ) Notice: Subject to any disclaimer, the term of this patent is extended or adjusted under 35 U.S.C. 154(b) by 0 days.

(21) Appl. No.: 15/820,529

(22) Filed: Nov. 22, 2017

(65) Prior Publication Data

US 2018/0190031 A1 Jul. 5, 2018

(30) Foreign Application Priority Data

Nov. 23, 2016 (KR) ........................ 10-2016-0156278

(51) Int. Cl.
| | |
|---|---|
| *G02B 27/22* | (2018.01) |
| *G06T 19/00* | (2011.01) |
| *H04N 5/262* | (2006.01) |
| *H04B 1/3805* | (2015.01) |
| *G02B 27/00* | (2006.01) |
| *G02B 27/01* | (2006.01) |
| *G06K 9/46* | (2006.01) |

(52) U.S. Cl.
CPC ........ *G06T 19/006* (2013.01); *G02B 27/0093* (2013.01); *G02B 27/0101* (2013.01); *G06K 9/46* (2013.01); *H04B 1/3805* (2013.01); *H04N 5/262* (2013.01)

(58) Field of Classification Search
None
See application file for complete search history.

(56) References Cited

U.S. PATENT DOCUMENTS

| | | | | |
|---|---|---|---|---|
| 5,900,849 | A * | 5/1999 | Gallery .................. | G06F 3/011 273/148 B |
| 10,048,751 | B2 * | 8/2018 | Jaafar ..................... | G06F 3/013 |
| 2004/0103111 | A1* | 5/2004 | Miller .................. | G02B 27/017 |
| 2005/0062869 | A1* | 3/2005 | Zimmermann ........ | G02B 13/06 348/335 |
| 2013/0278631 | A1* | 10/2013 | Border ................. | G02B 27/017 345/633 |
| 2013/0342572 | A1* | 12/2013 | Poulos ................. | G02B 27/017 345/633 |

(Continued)

FOREIGN PATENT DOCUMENTS

| | | | |
|---|---|---|---|
| KR | 10-2006-0048966 B1 | 5/2006 |
| KR | 10-2012-7028669 B1 | 8/2010 |

(Continued)

*Primary Examiner* — Nancy Bitar
(74) *Attorney, Agent, or Firm* — Bacon & Thomas, PLLC

(57) ABSTRACT

A mixed image device having a portable structure which includes a case, a mounting holder configured to mounting a small image device on a rear end of the case in a vertical direction, a reflector formed in a square shape on the front surface of the mounting holder to reflect the image upward, a translucent mirror formed in a square shape on the upper end of the reflector to reflect the image of the small image device such as a smart phone and having a reflectance ratio of 8:2 to 2:8, a handle configured at the front end of the case, and a controller configured at one end of the handle to adjust the image of the small image device. A user can simultaneously observe a neighboring environment reality scene and augmented image provided from the small image device by the translucent mirror while carrying the structure of the device.

7 Claims, 7 Drawing Sheets

(56) References Cited

U.S. PATENT DOCUMENTS

| | | | | |
|---|---|---|---|---|
| 2014/0372957 A1* | 12/2014 | Keane | ............... | G06F 3/013 |
| | | | | 715/852 |
| 2015/0346832 A1* | 12/2015 | Cole | ............... | H04N 19/597 |
| | | | | 345/156 |
| 2015/0373412 A1* | 12/2015 | Park | ............... | G06K 9/00288 |
| | | | | 725/12 |
| 2016/0349509 A1* | 12/2016 | Lanier | ............... | G02B 27/0172 |
| 2017/0103440 A1* | 4/2017 | Xing | ............... | H04W 4/90 |

FOREIGN PATENT DOCUMENTS

| | | | |
|---|---|---|---|
| KR | 10-2010-0099373 | B1 | 10/2010 |
| KR | 10-2011-0097983 | A | 9/2011 |
| KR | 10-2013-0106347 | A | 9/2013 |
| KR | 10-2013-0152450 | A | 12/2013 |
| KR | 10-2013-0168734 | B1 | 12/2013 |
| KR | 10-2014-0033616 | A | 3/2014 |

\* cited by examiner

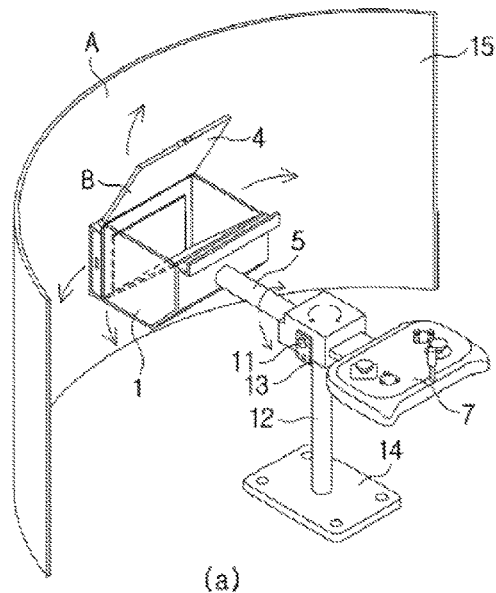
Fig. 7A
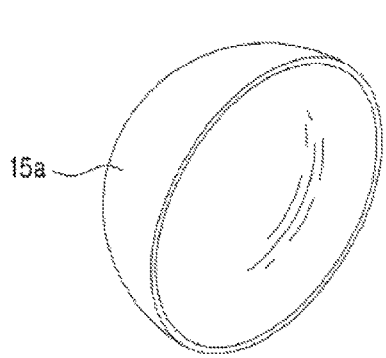 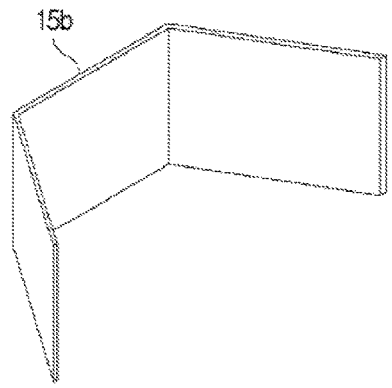
Fig. 7B　　　　　　　Fig. 7C

PORTABLE MR DEVICE

CROSS-REFERENCE TO RELATED APPLICATION

This application claims priority to and the benefit of Korean Patent Application No. 10-2016-0156278, filed on Nov. 23, 2016, the disclosure of which is incorporated herein by reference in its entirety.

BACKGROUND OF THE INVENTION

The present invention relates to a portable mixed reality (MR) device which can simultaneously see an actual exterior view and augmented reality using a small monitor having a computer function such as a small image device in a mixed reality device and uses a portable easy-to-use small display.

MR refers to mixed reality (hereinafter, referred to as "MR") in which virtual reality and an augmented reality are fused.

For example, in AR, when an engine of a vehicle is repaired, internal information of the engine inside the engine may be provided as an image and the like without dissembling the engine and when a consumer views a product displayed on a shopping center window by an AR device, an image for the product may be automatically provided and paid.

VR refers to a virtual reality structure, which provides a 3D image or a 2D image as an image as if a viewer is present at the scene through an image at view angles of left and right sides of 360° and upper and lower sides of 100° or more.

MR means obtaining simultaneously two functions by mixing the VR and the AR.

However, the conventional VR devices have a structure which is worn on head using mainly a head mounted display structure.

Accordingly, there are various inconveniences in which a separate computer device needs to be carried, a small image device needs to be doubly carried together, and a separate additional device needs to be purchased.

Further, the existing AR device is a structure using only a screen itself of the small image device.

Such an AR function is a structure in which a reality foreground and a virtual environment are simultaneously displayed on the screen of the small image device. That is, since a neighboring reality foreground is also displayed on the screen by a camera, a user focuses on only the screen of the small image device.

Accordingly, since the external peripheral vision is blocked, serious danger such as collision danger, traffic accidents, and the like occurs.

PATENT DOCUMENT (Patent Document 1) Korean Patent Application No. KR 10-2006-0048966 (Augmented reality image system using portable device)

(Patent Document 2) Korean Patent Application No. KR 10-2013-0106347 (Head-mounted device installed with small image device)

(Patent Document 3) Korean Patent Application No. KR 10-2014-0033616 (System for displaying augmented reality)

(Patent Document 4) Korean Patent Application No. 10-2013-0168734 (3D HMD system using small image device)

(Patent Document 5) Korean Patent Application No. KR 10-2010-0099373 (System for implementing augmented reality and augmented reality using small image device)

(Patent Document 6) Korean Patent Application No. KR 10-2013-0006245 (Position-based information augmented reality system and method for providing the same)

(Patent Document 7) Korean Patent Application No. KR 10-2011-0097983 (Glass-type monitor having augmented reality function)

(Patent Document 8) Korean Patent Application No. KR 10-2012-7028669 (Device and method for augmented reality)

(Patent Document 9) Korean Patent Application No. KR 10-2013-0152450 (Wearable device using augmented reality interface)

SUMMARY OF THE INVENTION

The present invention has been made in an effort to provide a portable structure capable of using or installing various position sensors such as a GPS and a Gyroscope sensor as it is using a small image display including a small image device and simultaneously observing images such as an augmented reality image, a virtual reality image, and an actual external neighboring reality foreground as one image, which are provided from a small image device such as a smart phone.

As illustrated in the drawing, the present invention comprises a mounting holder for mounting a small imaging device such as a reflector, a translucent mirror, and a small imaging device, and a case for constituting all of the configurations. The small image device may be mounted on the rear end of the case in a horizontal direction or a smart phone is mounted in a vertical form, and a mounting holder having a square shape and mounting the reflector is configured on the front surface.

A translucent mirror having a reflectance ratio of 8:2 to 2:8 is configured by one of planar, curved, and spherical shapes so that the small image device is reflected and the external foreground is transmitted upward on the front surface of the mounting holder and a handle having a controller capable of controlling an image on a small screen is coupled or separated.

As another method, a magnifier structure is provided horizontally with the translucent mirror in the system structure.

As yet another method, a vertical rotation means rotating up and down and a horizontal rotation means rotating left and right are coupled to the middle of the handle structure included in the system to rotate a viewing angle of the image at left and right sides at 360° and upper and lower sides at 100°.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIGS. 7A, 7B, and 7C illustrate an application example.

DETAILED DESCRIPTION OF THE INVENTION

Exemplary embodiments of the present invention will be described in detail below with reference to the accompanying drawings. While the present invention is shown and described in connection with exemplary embodiments thereof, it will be apparent to those skilled in the art that various modifications can be made without departing from the scope of the invention.

Unless specifically stated otherwise, all the technical and scientific terms used in this specification have the same meanings as what are generally understood by a person skilled in the related art to which the present invention belongs. In general, the nomenclatures used in this specification and the experimental methods described below are widely known and generally used in the related art.

Figure 1:
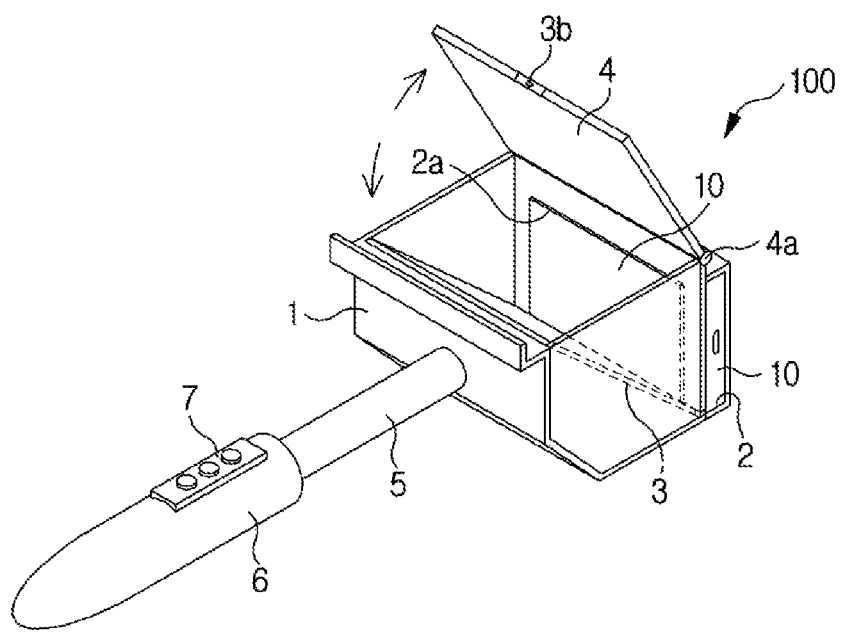
FIG. 1 is a configuration diagram in which the present invention is implemented.
Figure 2:
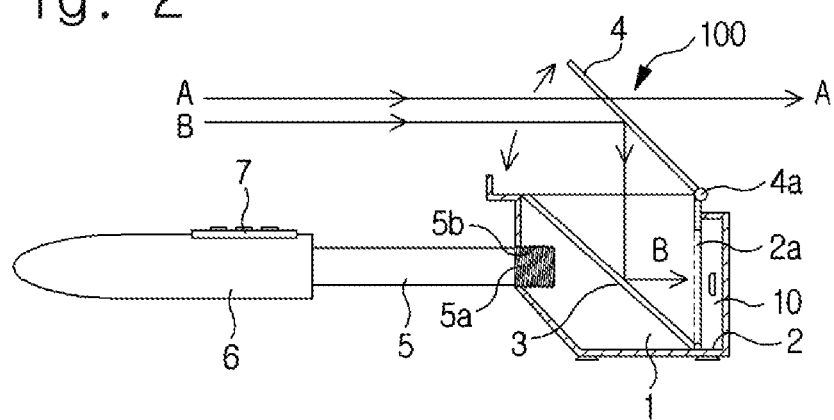
FIG. 2 is a diagram for describing a cross-sectional structure of FIG. 1.

As illustrated in FIGS. 1 and 2, the structure of the present invention constitutes an optical structure for implementing an augmented realty image, which includes a case 1 and a mounting holder 2 capable of mounting a small image device 3 in left and right directions on the rear surface of the case 1 in upper, lower, and vertical directions and has an image window 2a, to which the image of a small image device 10 is exposed, formed on the front surface of the mounting holder 2.

In the present invention, the small monitor device 10 is a small monitor having a diagonal size of less than 2 to 20 inches including a smart phone and constituted by various required position sensors such as a gyroscope sensor, a position sensor, and a speed sensor and the small imaging device 10 having a communication function with a computer.

A reflector 3 is formed in an upward square shape on the front surface of the image window 2a, a translucent mirror 4 is formed in a square shape on an upper end of the reflector 3 to reflect the image in a user direction. In addition, the translucent mirror 4 is constituted by a structure in which the image reflected from the reflector 3 is reflected and an external foreground of the rear end in a straight direction is transmitted, that is, some of the image is transmitted and some thereof is reflected.

The shape of the translucent mirror 4 selectively uses either planar or concavely-spherical shape.

The translucent mirror 4 is connected to a hinge 2 to be vertically rotated on the upper surface of the rear end of the case 1 and the translucent mirror 4 may be deployed or covered to the upper surface of the case 1 when carrying or if necessary.

A handle 6 is formed on the front surface of the case 1 and a controller 7 capable of controlling the image of the small image device 1 wirelessly or wiredly is configured at the rear end of the handle 6.

In this case, the image of the mounted small image device 10 is controlled by the controller 7 constituted on the surface of the handle 6.

Such a controller 7 may control a game or virtual reality image and an AR image wirelessly or wiredly and perform electronic payment.

Further, a keyboard capable of writing letters may be constituted together at the position of the controller 7.

The structure of the reflector 3 has a total reflection structure having only a reflection function.

The structure of the translucent mirror 4 is formed with a thin film made of a reflective material on a transparent glass surface and has transmittance straightly transmitted from the square of 20% to 80%, and the image of the small image device 10 incident from the lower end has a reflectance of 80% to 20% on the surface of the translucent mirror 4.

That is, the reflectance and the transmittance are adjusted to 8:2 to 2:8 according to the intended use of the present invention.

The reason is that the light of the external reality is strong when used in the daytime compared with the image brightness of the small image device 10, and the brightness of the small image device 10 is bright indoors or at night, and as a result, the brightness is decreased or increased according to a use place.

Figure 3:
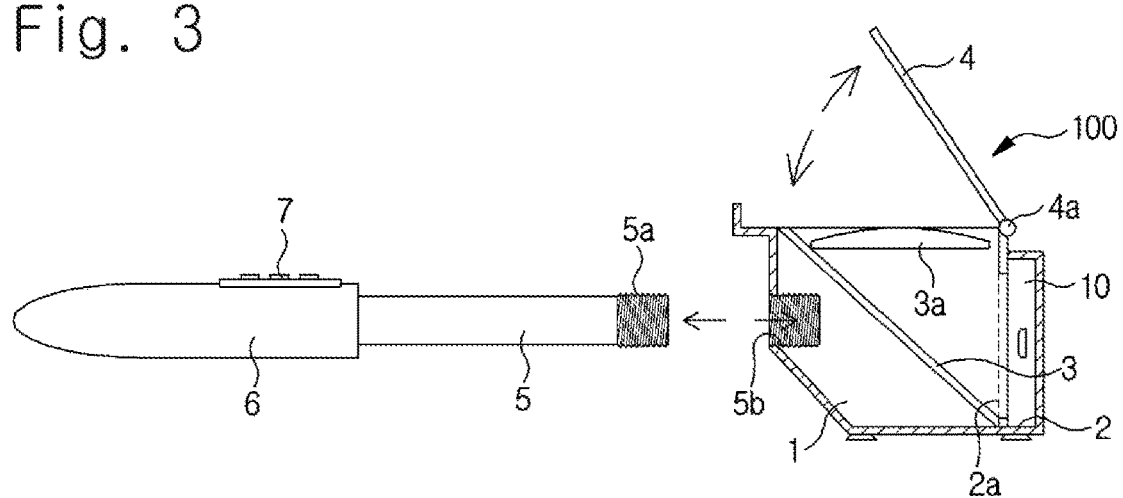
FIG. 3 is a configuration diagram in which a magnifier is coupled to a structure of the present invention.

As illustrated in FIG. 3, the handle 6 may be coupled with the case 4 by known fastening devices 5a and 5b in use and separated from the case 4 or fixed to the case 4 in carrying, and the handle 6 has a pipe shape and a use length thereof may be adjusted by overlapping many pipes having different thicknesses.

Figure 5:
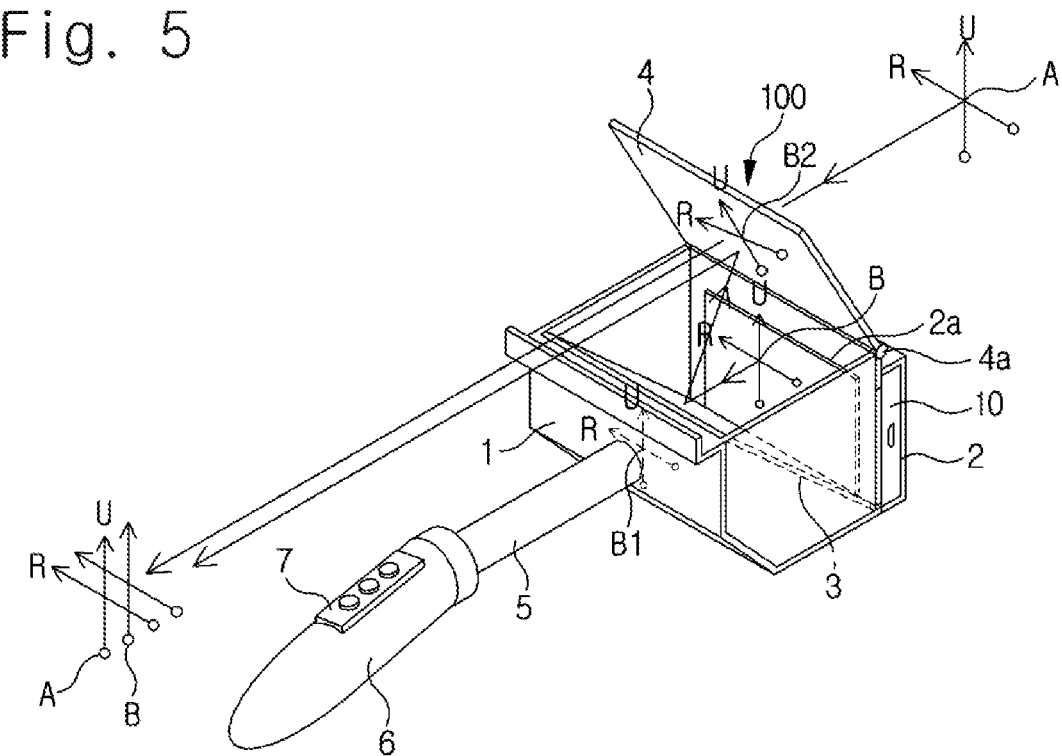
FIG. 5 is an explanatory diagram illustrating that upper, lower, left, and right sides of an external reality foreground and an augmented reality screen match each other.

Further, as illustrated in FIG. 5, the handle 6 may have a curved shape so that a user can use the handle 6 in a comfortable position.

Figure 4:
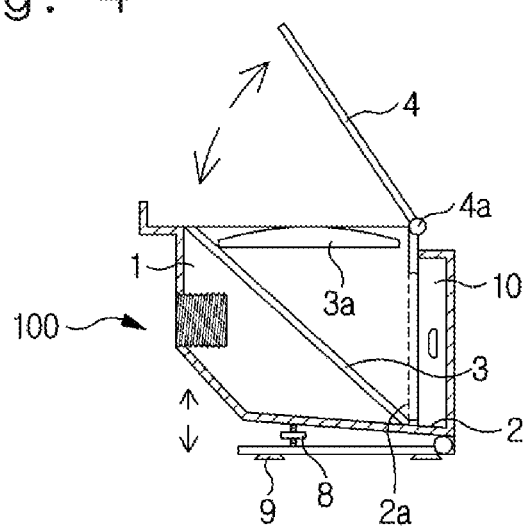
FIG. 4 is a using example of the present invention.

As illustrated in FIG. 4, external light irradiated to the top of the screen of the small image device 10 is blocked and the image of the small image device 10 is condensed to implement brightness at least two times larger than that of the related art.

As such, in the present invention, as illustrated in FIG. 2, an actual image of the rear end of the present invention is straightly observed through the translucent mirror 4 and the image of the small image device 10 is simultaneously observed through the translucent mirror 4 and the reflector 3.

That is, the image of the small image device 10 mounted vertically on the mounting holder 2 of the rear end of the case 1 is refracted and reflected upward from the front reflector 3 and then reflected on the translucent mirror 4 and reflected to the position of the user 20.

In the present invention, as illustrated in FIG. 5, while the user 20 mounts the small image device 10 in the same vertical direction as the virtual reality (VR) image, it is important for the user 20 to provide upper, lower, left, and right images of the neighboring reality image and the virtual reality image of the small image device 10 in the same direction.

That is, as illustrated in FIG. 2, the reality foreground of the rear end of the translucent mirror 4 which straightly transmits the translucent mirror 4 is transmitted as it is.

As illustrated in FIG. 5, in the structure of the present invention, in which the small image device 10 is mounted in the vertical direction at the left and right sides, a vertical image direction U and a horizontal image direction R of the small imaging device 10 are provided in the form of B and are upwardly reflected at 90° in the form of B1 in the 45° rectangular reflector 3 and reflected at 90° from the surface of the translucent mirror 4 in the form of B2 toward the viewer.

Accordingly, the upper, lower, left and right directions of the actual reality image A and the virtual reality image or augmented reality image B may be observed in the same direction.

Unlike the structure of the present invention, if the small imaging device 10 is mounted in a vertical direction, the VR and augmented reality images are viewed only in the bottom direction.

Accordingly, in the present invention, it is possible of simultaneously observe the external foreground and the virtual image of the small image device by combining two reflection actions while the neighboring image and the virtual reality image are configured by vertically mounting the small image device so that a sensor such as a gyroscope sensor, a position sensor, and an acceleration sensor included in the small image device 10 operates in the same direction as the small image device in use.

Further, as illustrated in FIG. 4, an angle adjustment device 8 adjusting a vertical angle is added at the lower portion of the case 1 from which the handle 6 is separated and may be used for an AR device on a desk or an automobile navigation.

Figure 6:
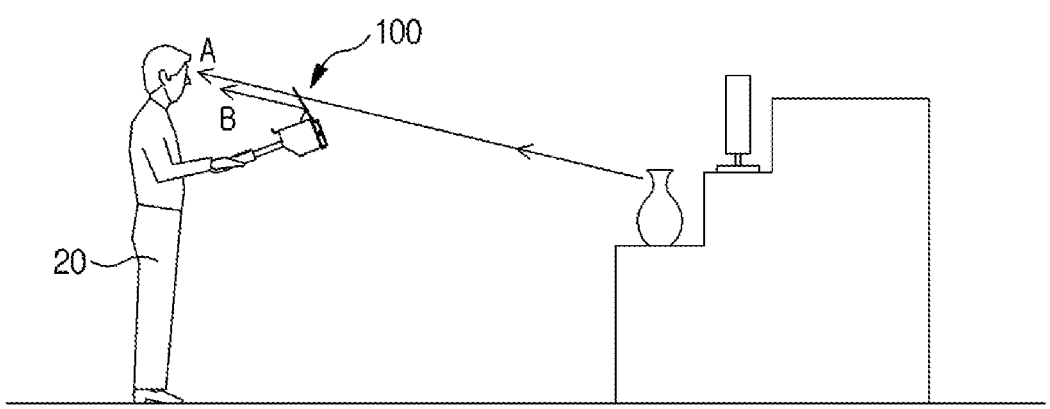
FIG. 6 is a using example.

In the present invention, as illustrated in FIG. 6, the user 20 may simultaneously observe a neighboring environment reality scene and an augmented image or virtual environment provided from the small image device 10 by the translucent mirror 4 in a shopping center, a workshop, a theme park, or the like while carrying the structure of the AR device 100 of the present invention.

For providing the 3D virtual image, the small image device 10 may be replaced with a 3D device.

Accordingly, in the present invention, the user 20 can safely move because the user 20 may simultaneously view the neighboring environment while moving the present invention.

Therefore, it is possible to observe the AR image safely and variously by using the small image device 10 such as finding characters in the cartoon in the real world, using images of products displayed on the window, and virtual training.

As such, the structure of the present invention is configured by the form in which the handle 6 is separated from the case 4 as illustrated in FIG. 3, and a belt or an auxiliary support is provided at both ends of the case 4 to be hung on the neck or seated on the chest, thereby simultaneously viewing the reality scene and the image provided by the small image device 10.

In this case, the image controller 7 may be separately used.

Further, in the case of mounting a 2-9" small display instead of the small image device 10, the small image device may be configured on the bottom surface of the lower end in the case 4 in a horizontal direction. In this case, a magnifier 3a may be additionally configured on the front surface of the small image device 10 and the structure of the reflector 3 may be removed. In this case, the left and right images are inverted in right and left directions to coincide with the left and right directions of the external image.

However, even in any case, in the small image device 10, a configuration of the position image sensor that provides the corresponding image according to a position of the image of the gyro sensor, the acceleration sensor, and a position sensor is required.

In the configuration of the present invention, the structure of the translucent mirror 4 may be configured in a spherical shape.

In this case, the image of the small image device 10 enlarged by the translucent mirror 4 is adjusted to be viewed well at the position of the user 20 by appropriately adjusting angle of the translucent mirror 4, a screen angle and a supporter of the small image device 10, and angles of the handles 5 and 6.

As such, in the present invention, as illustrated in FIGS. 7A-7C, a supporter 5 is configured in a horizontal direction of the structure of the case 1 including the translucent mirror 4 and the small image device 10, the controller 7 is configured at the rear end of the supporter 5, and then a vertical rotation means 11 capable of vertically rotating the case 1 is included in the supporter 5. A horizontal rotation means 13 capable of simultaneously rotating the vertical rotation means 11 and the case 1 in a horizontal direction is coupled and various screens 15 such as screen displaying the image are coupled to the front end of the present invention.

In this case, the structure including the small display 10 and the translucent mirror 4 is coupled with the vertical rotation means 11 and the horizontal rotation means 13.

The configuration of the screen 15 is applied to all thin-film image displays displaying images by electronic signals of an LCD, an OLED, a micro LED, and the like. Further, the screen 15 may be configured by a projection screen displaying a projection image projected by a projector.

The shape of the screen is applied to all of a circular screen and a concave screen illustrated in FIG. 7A, a dome screen 15a illustrated in FIG. 7B, and a triangular screen 15b illustrated in FIG. 7C.

The exemplary structure of the present invention may be observed simultaneously with the image of the small image device 10 through the translucent mirror 4.

In the exemplary embodiment, while the user views the image on the screen 15 projecting the translucent mirror 4 and the image of the small image device 10 reflected from the translucent mirror 4, the case 1 moves by using the horizontal rotation means 11 and the vertical rotation means 13.

For example, when a specific building is clicked by the controller 7 while displaying a city image in which city buildings are arranged on the screen 15 and rotating the case 1 up, down, left, and right, the small image device 10 provides internal scenes or information of the corresponding buildings.

As another example, when a specific vehicle is clicked by the controller 7 while displaying various types of vehicle images on the screen 15, the small image device 10 may provide a traveling state of the corresponding vehicle, price information, and the like.

Therefore, the structure of the present invention may observe the external reality image, the provided virtual reality, the augmented image information, and the like while moving one translucent mirror or rotating up, down, left, and right.

According to the present invention, unlike an existing HMD structure, it is possible to observe an AR image by using a small image device which observes the image while carrying and simultaneously observing a virtual reality image, an actual external image, and an augmented reality provided by mounting a gyroscope sensor, a GPS sensor, a speed sensor, and an acceleration sensor on the small image device or using the small image device such as a smart phone embedded with the sensors as it is.

Further, even though the virtual reality or augmented reality image of the small image device is reflected and refracted in an optical device, the upper, lower, left, and right sides of the virtual reality image and the actual reality image coincide with each other in the same direction.

A user can observe the images of the smart phone and the small image device, the reality foreground at the rear end, and the virtual reality image provided from the small image device as images in which upper, lower, left and right sides coincide with each other.

Further, while the user simultaneously views the virtual reality image and the neighboring external actual image, the user observes the neighboring situation at the same time to use the small image device while safely moving.

Further, a magnifier provided between the translucent mirror and the reflector has an effect of increasing the brightness by condensing the brightness of the image of the small image device two times or more.

Further, the images such as the virtual reality image, the augmented reality image, and the external foreground image are all mixed to be observed.

It will be apparent to those skilled in the art that various modifications can be made to the above-described exemplary embodiments of the present invention without departing from the scope of the invention. Thus, it is intended that the present invention covers all such modifications provided they come within the scope of the appended claims and their equivalents.

What is claimed is:

1. A portable mixed reality image device comprising:
    a mounting holder provided for a smart phone to be erected vertically;
    a reflector which is provided upward slantingly on a front surface of the mounting holder so as to reflect upward an image on the smart phone;
    a semi-translucent mirror which is provided slantingly in a front direction on an upper end of the reflector so as to reflect the image of the smart phone to a user, wherein a ratio of reflectance to transmittance is 8:2 to 2:8;
    a case which is provided with the mounting holder, the reflector, and the semi-transparent mirror as one system;
    a handle provided on one side of the case; and
    a fastening means for fastening and separating the handle, wherein a user simultaneously observes the external image transmitted from the semi-translucent mirror and the image of the smart phone reflected from a lower part of the semi-translucent mirror as one image matched at upper, lower, left, and right sides through the semi-translucent mirror at a spaced distance from the handle.

2. The portable mixed image device of claim 1, wherein the smart phone is provided as a small image device to which a location sensor is connected.

3. The portable mixed image device of claim 1, wherein a screen is configured and coupled on a front surface of the semi-translucent mirror and a vertical rotation means and a horizontal rotation means are connected to a lower portion of the case.

4. The portable mixed image device of claim 2, wherein the handle is separated from one end of the case and configurable to be used for a navigation of a vehicle.

5. The portable mixed image device of claim 2, wherein a screen is configured and coupled on a front surface of the semi-translucent mirror and a vertical rotation means and a horizontal rotation means are connected to a lower portion of the case.

6. The portable mixed reality image device of claim 1, wherein the semi-translucent mirror is provided in a spherical shape.

7. The portable mixed reality image device of claim 1, wherein a magnifier is provided between the reflector and the semi-translucent mirror.

* * * * *